July 2, 1974   H. J. HALE   3,822,149
RECHARGEABLE ZINC ELECTROCHEMICAL ENERGY CONVERSION DEVICE
Filed Feb. 17, 1972   4 Sheets-Sheet 1
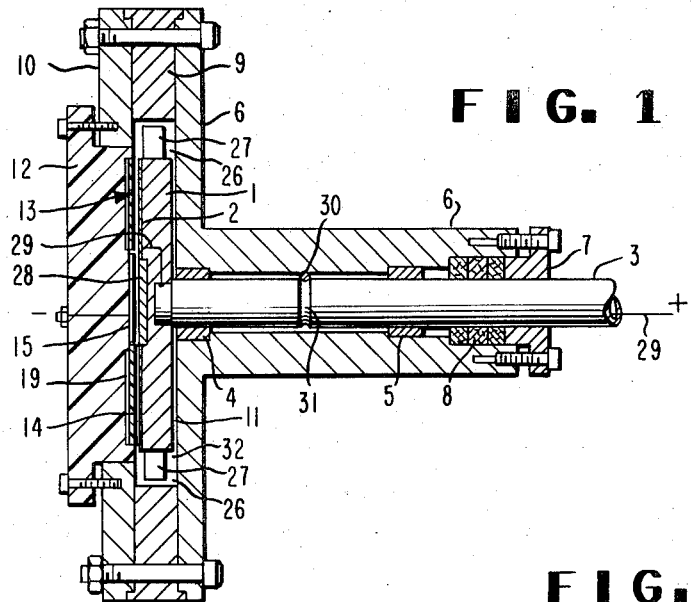

3,822,149
RECHARGEABLE ZINC ELECTROCHEMICAL ENERGY CONVERSION DEVICE
Hubbert Jackson Hale, Wilmington, Del., assignor to E. I. du Pont de Nemours and Company, Wilmington, Del.
Filed Feb. 17, 1972, Ser. No. 227,046
Int. Cl. H01m 27/00, 29/04, 47/00
U.S. Cl. 136—86 A
12 Claims

ABSTRACT OF THE DISCLOSURE

A rechargeable zinc cell and battery, preferably a zinc-air cell and battery, are disclosed in which the cell comprises (1) a circular casing having a circular reservoir with electrolyte contained therein; (2) a rotatable electrode, having at least one planar zinc surface, enclosed coaxially in the reservoir; (3) a stationary planar counter-electrode spaced from the rotatable electrode; (4) means for preventing the electrochemical reaction in the axial area of the zinc surface; (5) wiper means disposed between the electrodes for lightly abrading the zinc surface, and (6) means for agitating the electrolyte to maintain particulate matter in suspension.

There is also disclosed a method of operating a rechargeable zinc cell such as the above zinc cell in which the zinc surface is continuously smoothed and leveled during the charging of the cell with a resilient wiper blade and at least intermittently lightly abraded during the discharging of the cell.

BACKGROUND OF THE INVENTION

Field of the Invention

This invention relates to zinc electrochemical energy conversion cells and more specifically to improved electrically rechargeable zinc-air batteries.

Prior Art

It is well known that zinc-air battery systems of the kind utilizing zinc anodes and air depolarizing cathodes in combination with a suitable alkaline electrolyte such as potassium hydroxide or sodium hydroxide exhibit outstanding electrochemical performance at moderate operating temperatures. In these battery systems, as in all battery systems, one of the salient factors to be considered is energy density. As used herein, energy density is defined as the total energy delivered by the battery system divided by the total weight of the system. This is usually stated in watt-hours per pound. Within the scope of the definition, the battery system weight includes the combined weight of all the components necessary to render the battery functional and specifically includes components such as the electrolyte and additives, the zinc anode, the cathode, battery case, electrode support structures, terminals, and auxiliary devices. Thus, for a given quantity of consumable electrode materials, it is advantageous to restrict the weight of the other constituents of the system to minimum levels. Accordingly, compact, mechanically rechargeable secondary zinc-air batteries containing electrolyte to zinc weight ratios of 3 to 1 or less exhibiting energy density levels up to 100 watt-hours per pound can be constructed.

The electrolyte most often used in zinc-air batteries is a liquid solution consisting of 30–40 percent by weight potassium hydroxide in water. When the battery is in the fully charged condition at the low electrolyte to zinc ratios, the electrolyte is a completely solids-free liquid. As the battery is discharged, the electrolyte steadily undergoes a viscosity change due to the formation of insoluble zinc oxide particles until, eventually, the solution becomes a thick viscous slurry. The transformation of the electrolyte does not appreciably alter the discharge performance of the battery; hence, it is not uncommon to operate these devices to deep discharge, that is, greater than 50 percent electrochemical conversion of the consumable zinc material. Because the reactive materials are relatively light weight, in abundant supply and comparatively inexpensive, secondary zinc-air batteries are ideally suited for many end use applications ranging from power supplies for communications equipment to small electric motor-driven utility vehicles and the like. Most of the smaller battery systems of this type are usually discarded after initial discharge, while the intermediate size versions are mechanically recharged, which involves replacement of the depleted zinc electrode and the electrolyte solution. This procedure essentially amounts to an expensive rebuilding of the battery, and, for this reason, has not gained more widespread use. On the other hand, electrical recharging of commercial zinc-air batteries has heretofore not been very successful due to the inherent difficulties associated with rejuvenation of the depleted zinc electrode from the solids laden electrolyte slurry.

The electrical recharge cycle of the zinc-air battery is essentially an electroplating operation whereby a layer of zinc metal is deposited on the depleted electrode. Conventional electroplating of zinc onto a surface from an alkaline solution, however, is an exceedingly complex electrochemical conversion phenomenon involving numerous variables, some of which are known and others not known or fully understood. As a consequence, most attempts at electrodeposition of zinc metal in batteries has usually resulted in the formation of rough, nonuniform layers loosely attached to the substrate surface, which increasingly worsen after the initial plating cycle. In a practical zinc-air battery, it is critically important that the zinc be reproducibly replated during recharge and that the plating process be capable of numerous recyclings without substantial deterioration of the electrode surface or decrease of electrochemical conversion efficiency. It is also preferable to establish a minimum interelectrode gap space within a cell in order to achieve the advantages of compactness, minimum internal electrical resistance, and maximum net power output from the battery.

In the design of a practical battery system with the aforementioned preferred features, some compromises must be made. For example, as the battery is discharged, the zinc is consumed and the interelectrode gap widens. This, of course, is accompanied by a corresponding increase in the internal electrical resistance and a decrease in net power output. Therefore, it has been found that setting the interelectrode gap at about 0.06 inch or less at the time the battery is constructed significantly improves the overall battery performance. However, the use of such narrow interelectrode gaps makes the quality of the zinc deposited layer extremely important. Any gross variations in the thickness and uniformity of the deposited zinc layer will affect the width of the gap causing variations in local current densities and ultimately lead to a short circuit and premature termination of the recharge cycle. Likewise, electroplating of a spongy, porous layer will result in a given weight of metal occupying a greater volume. This results in increased plating thickness, premature filling of the available interelectrode gap and another cause of short circuiting the cell. In addition, the high concentration of solids in the electrolyte also tends to promote the formation of a nonreactive layer or coating on the electrode which increases in thickness and gradually passivates the electrode. Thus, in the past, electrically rechargeable zinc-air batteries have prematurely failed either due to dendritic growth during the recharge cycle or to the passivating effect of the nonreactive coating on the electrode during the discharge cycle or to a combination of both.

Some techniques have been employed to circumvent the problems associated with the presence of high solids content in the electrolyte. For example, the prior art shows in U.S. Pat. 3,391,027 to J. T. Porter II that the insoluble particles can be removed from the electrolyte by pumping the solution outside the cell and subjecting it to filtration and recirculation. Another method, used in the laboratory, is to greatly increase the electrolyte to zinc weight ratio upwards of 50 to 1 to assure that formation of the insoluble products never approaches concentration levels sufficient to cause precipitation of zinc oxide on the surface of the electrode and thereby seriously interfere with the recharging cycle. These corrective measures are only partially satisfactory compromises since an external recirculation system is complex and costly while the use of excessive quantities of electrolyte adds to the volume and weight of the battery. In either case, the resultant energy density level of such battery system becomes too low.

In U.S. Pat. 3,560,261 to Z. Stachurski et al. and U.S. Pat. 3,440,098 to Z. Stachurski yet another technique is described for minimizing the effects of dendritic growth on the anode surface. This involves rotating the anode electrode at a high velocity to induce a flow of electrolyte along the active surface. To further improve the electrochemical performance of the battery, a resilient roller-deflector is utilized to compress and densify the zinc layer. The action of the rotary electrode and the roller-deflector does reduce the formation of dendrites, but the active surface of the anode nevertheless may be subjected to rapid deterioration as zinc oxide particles may be unavaoidably trapped under the roller-deflector and "ironed" into the newly formed zinc layer. As a consequence, during the discharge cycle, the energy from any zinc oxide entrapped in the electrode surface that would ordinarily have been converted to zinc metal is never recovered.

Other methods used to improve electrical recharging include improvement of the electrolyte. In U.S. Pat. 3,540,935 to K. B. Keating et al., a complexing agent such as a cyanide salt of an alkali metal is added to the electrolyte to increase solubility of the zinc in the electrolyte and to improve the quality of the plating. Although the agent serves to counteract the limiting effects of dendritic growth and produce a harder, more dense layer of zinc, there is still the problem of passivation of the electrode surface under repeated recharge cycling.

BRIEF DESCRIPTION OF THE DRAWINGS

FIG. 1 is a sectional view of a zinc-air cell showing a rotating zinc electrode coacting with a stationary resilient wiper blade, an air-depolarizable discharge electrode and a coplanar recharge electrode.

FIG. 2 is an enlarged, partial sectional plan view of the stationary discharge-recharge electrode of FIG. 1 showing a resilient wiper blade which is employed to wipe the active surface of the zinc electrode.

FIG. 3 is a sectional view of the electrode of FIG. 2 taken along axis 3—3 showing the coplanar configuration of the discharge and recharge electrodes and the air circulation passageways behind the discharge electrode.

DETAILED DESCRIPTION OF THE INVENTION

Figure 4:
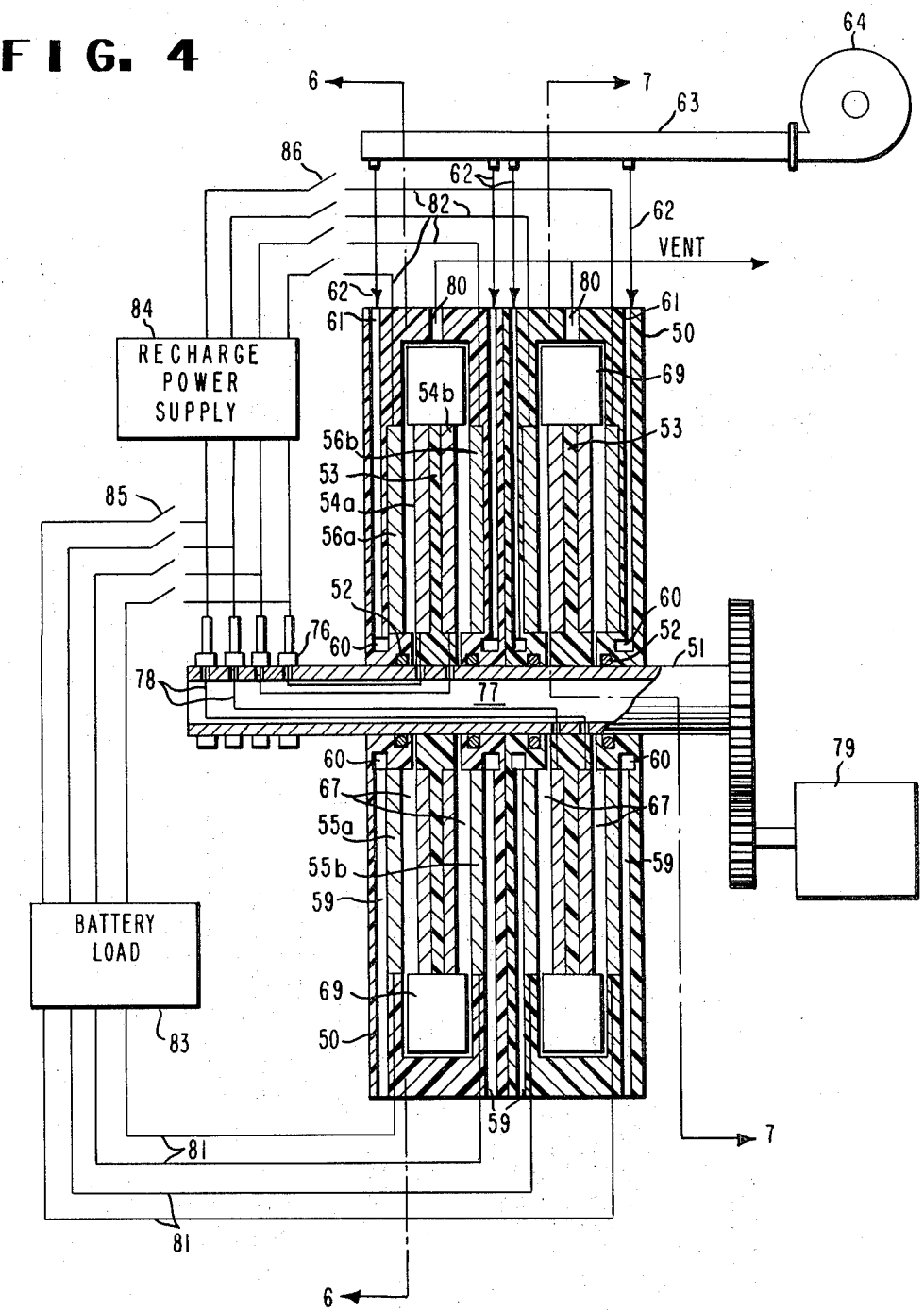
FIG. 4 is a sectional view of a multicell zinc-air battery system showing a rotary hollow shaft, slip ring assembly, and auxiliary drive means.

In FIGS. 1, 2, and 3, a single zinc-air cell comprises a disc-shaped rotating electrode 1 containing a flat active surface 2 composed of a predetermined quantity of zinc metal. Electrode 1 which is fabricated from an electrically nonconductive polymeric material is affixed to one end of a rotatable shaft 3 which is journaled in spaced sleeve bearings 4, 5 that are retained in a tubular casing 6. The external end of the shaft 3 is suitably coupled to the output of an auxiliary D.C. electric motor (not shown). The motor can be connected to the load side of the battery since it functions to drive the shaft at a low r.p.m. (about 6 r.p.m.) and therefore consumes a minimal amount of power. End cap 7 and packing glands 8 comprise a rotary seal that, together with bearings 4 and 5, prevents leakage of the electrolyte along the shaft. Shaft 3 is axially constrained in casing 6 by a dowel 30 which is pinned to casing 6 and slidably engaged in an open circumferential groove 31 on shaft 3. In addition, shaft 3 is adapted with an internal longitudinally extending passageway along which an electrical conductor 29 serves to connect the active surface 2 to a conventional slip-ring assembly (not shown) that is mounted at the external end of shaft 3. The slip-ring assembly thus forms one of the battery terminals to which an electrical load or recharge means is connected.

At the disc end of shaft 3, casing 6 expands into a flange configuration which is combined with a circular spacer 9 and end ring 10. These are assembled and held together in a liquid-tight manner by spaced threaded fasteners forming a compact cavity hereinafter described as reservoir 11. Within reservoir 11, rotating electrode 1 and a stationary air-depolarizable electrode 13 is enclosed and immersed in a predetermined quantity of an aqueous solution of potassium hydroxide electrolyte. In the present instance, the electrolyte to zinc metal weight ratio is less than 15 to 1 (15:1 to 3:1) and preferably 3 to 1. Best results are obtained with the battery when the electrolyte contains a small amount of an additive which aids in redeposition of the zinc during recharging. Such additives can be the alkali metal cyanides disclosed in U.S. Pat. 3,540,935 or polyethyleneimines disclosed in U.S. Ser. No. 170,986 filed Aug. 11, 1971, in the names of John Derek Rushmere and Edward Wayne Zahnow, now abandoned, both assigned to the assignee of the present application. Most of the electrolyte is contained in an annular region or space 26 which is formed within reservoir 11 between the circumferential edge of electrode 1 and end ring 10. As best shown in FIGS. 2 and 3, electrode 13 is an integral part of a disc plate 12 which is fabricated from an electrically nonconductive polymeric material and attached to end ring 10 by a plurality of threaded fasteners.

As best shown in FIGS. 2 and 3, plate 12 also serves as a support member for a wiper blade 14 and a recharge electrode 15 which are disposed adjacent and coplanar with electrode 13. It is noted that the specific internal structure and materials of construction of electrode 13 can be composed of any variety of combinations common to air-depolarizable cathodes. In the instant case, the active surface of electrode 13 is composed of a thin semi-permeable polymeric membrane 16 about 0.10 inch thick coated or interspersed with a fine particle catalyst 17 made of platinum or carbon and overlaid by a current collector 18 made of fine nickel wire screen. Collector screen 18 is suitably attached to a lug (not shown) that protrudes externally through the wall of plate 12 and serves as the discharge electrode terminal. Catalyst 17 and collector screen 18 are directly opposite the active surface 2 of electrode 1 separated by an an interelectrode gap of about 0.020 to 0.060 inch which is filled with the electrolyte solution designated by reference numeral 32 in reservoir 11 and annular space 26 thereof.

The opposite surface of membrane 16 is uncoated and exposed to an external flow of air or oxygen enriched gas. Air is circulated past the membrane 16 through a network of radially extending passageways 19 that are machined into plate 12. At one end, passageways 19 open into a common input manifold 20 which communicates with inlets 21, 22. These inlets 21, 22 are connected by conventional tubing, or conduits, to the output of a small air blower (not shown) or a pressurized gas supply (not shown). As in the case of the electrode drive motor, the air blower power consumption is relatively small; hence, it can also be connected to the load side of the battery. The downstream side of passageways 19 terminate into a collector manifold 23 via outlets 24. To assure optimum operability of the recharge electrode 15, a controlled air flow rate should be maintained across membrane 16. Hence a predetermined pressure differential between the inlets and outlets should be established.

Still referring to FIG. 2, recharge electrode 15 is a flat sector-shaped nickel conductor affixed to the plate 12 by threaded fasteners (not shown) which also function as terminal lugs for connection to the output side of a D.C. recharge power supply. Adjacent the downstream edge of electrode 15 is a stationary wiper blade 14 which is fixedly secured with a recessed cavity in plate 12 by means of a clamping bracket 25 and ordinary threaded fasteners. The working portion of blade 14 is a flat thin strip of elastomer having a longitudinal wiping edge mounted to flex at a shallow angle against the moving active surface 2 of electrode 1. The blade is also skewed at an oblique angle (greater than 90°) relative to the velocity vectors of the active surface 2 such that particulate material is deflected radially to the circumferential edge of surface 2.

As previously mentioned, a minimum quantity of electrolyte solution is contined within the reservoir 11 and its annular space 26 which transforms into a high solids slurry early in the discharge cycle of the battery. Consequently, means are provided to continuously agitate the particulate material in the electrolyte during the recharge cycle. As shown in FIG. 1, this is accomplished by a plurality of radial paddles 27 attached to the circumferential surface of electrode 1. These extend into the annular space 26 with a minimum clearance between the paddle edges and the reservoir walls. The close clearances minimize zones of stagnation flow and assure complete thorough mixing of the electrolyte.

Still referring to FIG. 1, adjacent the axial center of electrode 1, the velocity of electrolyte movement tends to approach stagnation flow with a correspondingly increased tendency for dendritic growth. Accordingly, a center circular insert 28 is affixed to electrode 1 as one way to neutralize the central portion of active surface 2. The diameter of insert 28 is sufficiently large such that active surface 2 is actually an annular region in configuration. The annular configuration provides the added advantage of reducing the surface velocity gradient between the inboard and outboard edges during operation. Although the surface velocity does actually increase as the radius increases, the surface velocity of the electrolyte at a given radius level remains constant during the various cycles of the anode and thus improves the character of the electrode surface.

The coplanar configuration of the discharge and recharge electrode makes for an ideal compact multicell battery system.

In FIG. 4, a compact multicell system is depicted wherein the electrodes are incorporated into a self-contained bicell module 50 which is serially assembled with other modules on a common rotary shaft 51 and clamped together by a plurality of tie bolts (not shown). In FIG. 4, only a two-module embodiment consisting of four cells is depicted for the sake of simplifying the discussion. In actual practice, however, a greater number of modules can be assembled, the final arrangement being limited only by the end use requirements. Accordingly, each module 50 is a generally circular casing made of a suitable moldable material preferably a reinforced polymeric substance because of its light weight, low cost, corrosion resistance and electrical nonconductivity.

At the interface between the seals 52 is a rotary disc electrode 53 which extends into the module 50. Disc electrode 53 is likewise constructed of a reinforced polymeric material and functions as a support for flat annular shaped active zinc surfaces 54a, 54b that are adhesively bonded to the front and back surfaces forming a dual electrode structure. Opposite the active surfaces 54a, 54b are stationary discharge electrodes 55a, 55b and the coplanar recharge electrodes 56a, 56b.

Figure 5:
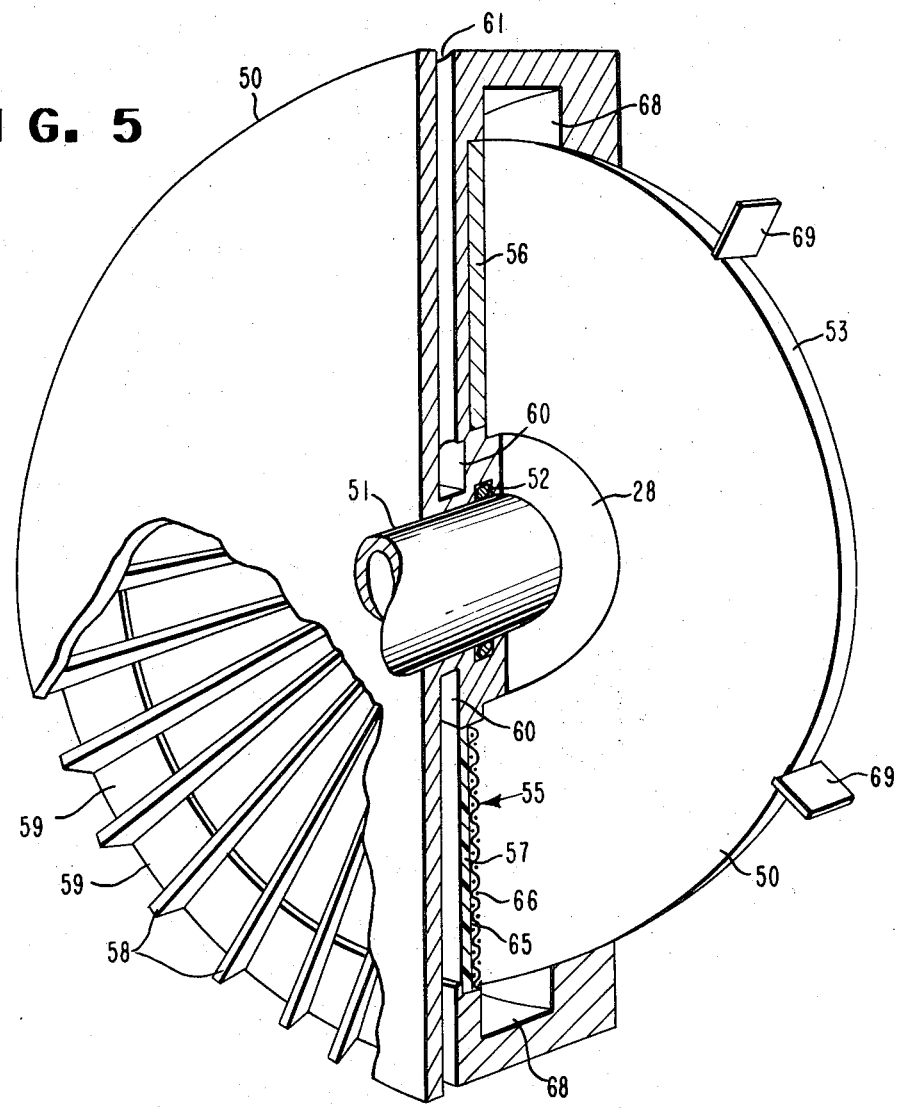
FIG. 5 is a partial sectional isometric view of the bicell module of FIG. 4 showing the air passageway pattern for the air-depolarizable discharge electrode.

As best shown in FIG. 5, discharge electrode 55 is a typical air-depolarizable electrode which in the present instance is composed of a thin semi-permeable membrane 57 such as one made of fluorocarbon polymeric material sold under the trade name of Teflon ® and supported on radial ribs 58 that are an integral part of module 50. Ribs 58 also serve the dual purpose of defining radial passageways 59 through which a flow of air or oxygen enriched gas is circulated. The inner ends of passageways 59 connect with an annular distribution header 60 which in turn is connected to an inlet 61 and a feed conduit 62 (depicted in FIG. 4). The upstream end of conduit 62 is connected to a common manifold 63 which communicates with the output of a small air blower 64. Referring back to FIG. 5, the external ends of the passageways 59 outlet into the atmosphere. The electrolyte side of membrane 57 is coated or interspersed with a catalyst 65 composed of platinum or carbon particles and overlaid by a current collector screen 66.

Figure 6:
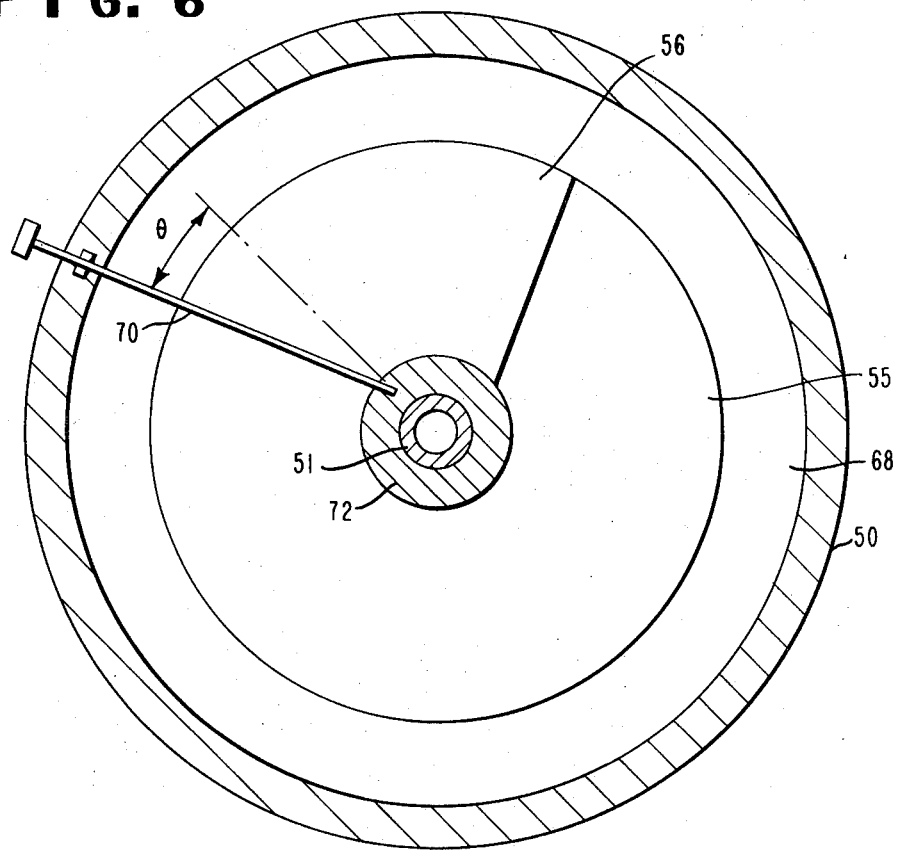
FIG. 6 is a sectional view of FIG. 4 taken along the 6—6 axis looking toward the active surface of the stationary discharge-recharge electrode showing the circular battery casing, the annular electrolyte reservoir and the preferred angular position and location of the wiper blade device.

As shown in FIG. 6, recharge electrode 56 is a flat sector-shaped nickel plate adhesively bonded within a recessed cavity of module 50. The effective area of the coplanar surface of recharge electrode 56 is about 25 percent of the total area of the discharge electrode 55.

The electrolyte solution is contained within the reservoir comprised of the narrow width interelectrode gap 67 and annular reservoir 68. Since the electrolyte contains a substantial amount of zinc oxide particles, the solution must be agitated to avoid undesirable settling of the particles. Accordingly, paddles 69 are affixed to the periphery of disc electrode 53 and are rotated therewith.

During the discharge and recharge cycles, the active zinc surface 54 of each electrode 53 is continuously wiped by a resilient wiper blade 70.

Figure 7:
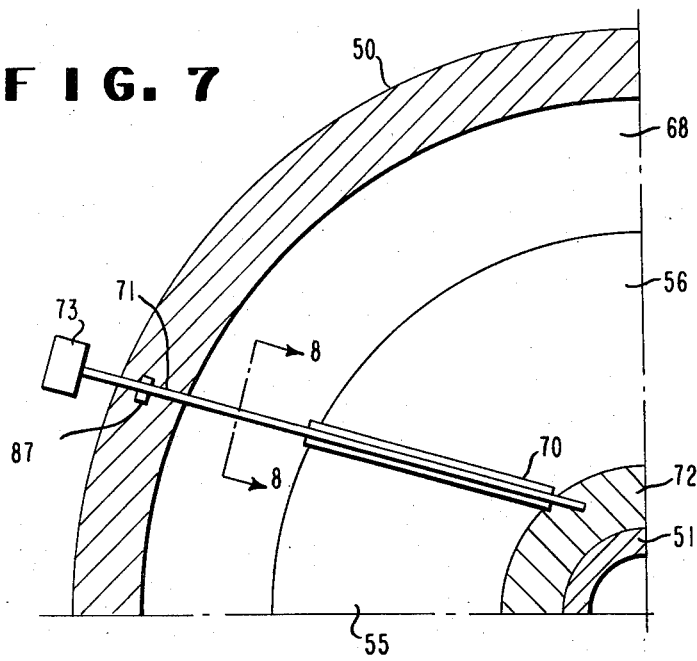
FIG. 7 is an enlarged partial sectional view of the battery of FIG. 4 taken along the 7—7 axis looking toward the discharge-recharge electrode showing the leading edge of the shaft mounted wiper blade.

As best shown in FIGS. 7 and 8, blade 70 is interposed in the interelectrode gap 67 on the downstream side of the recharge electrode 56 at a shallow oblique angle; that is, along a line not intersecting the axial center of the disc electrode 53. Wiper blade 70 is mounted on a small diameter shaft 71 which is journaled at one end in the hub 72 portion of module 50. The other end of shaft 71 protrudes through the wall of module 50 and terminates into a hand knob 73. A packing blade 87 encloses the opening and maintains a fluid-tight seal.

Wiper blade 70 can be placed at any convenient location within the interelectrode gap 67 as long as the active surface 54 is fully wiped. In the preferred embodiment, blade 70 is set at the oblique angle $\theta$ of 30 degrees to facilitate outward radial movement of particulate material. Thus, any particles removed from the surface 54 are rapidly deflected toward the annular reservoir 68 and thereby removed from further interaction with the plating action during the recharge cycle.

Figure 8A:
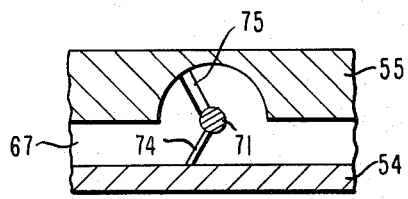
FIGS. 8a to 8c are sectional enlarged views of the wiper blade assembly of FIG. 7 taken along the 8—8 axis showing two blades having different wiping characteristics affixed to a manually rotable shaft.
Figure 8B:
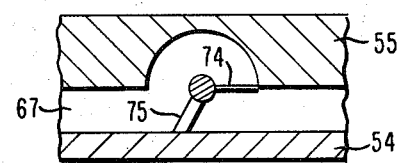
Figure 8C:
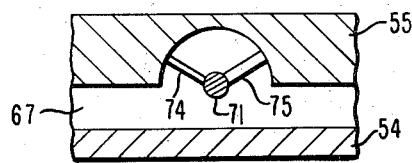

In its simplest embodiment, wiper blade 70 comprises a flat strip of resilient elastomer. Because conditions vary during the discharge and recharge cycles, different wiping actions are necessary to optimize the operation of the battery. To counteract the formation of a thin passivating film on the active surface 54 during discharge, a slightly more abrasive wiping action is required to break up the film. Conversely, a more subdued smoothing action is preferred during the recharge cycle. Thus, as shown in FIG. 8, a dual blade configuration is utilized comprising the soft elastomer strip 74 for the recharge function and a slightly stiffer strip 75 for the discharge function. Both elements are rigidly attached to the shaft 71. In FIG. 8a, the elastomer strip 74 is in the operative position during recharge while in FIG. 8b, stiffer strip 75 is operative during discharge. These operative modes can be adjusted manually by means of hand knob 73. In addition, as depicted in FIG. 8c, wiper 70 can also be fully disengaged from the active surface 54.

Referring back to FIG. 4, rotary shaft 51 is modified at one end by a slip ring assembly 76 and an internal longitudinal passageway 77. A plurality of insulated lead wires 78 are conveyed within the passageway 77 and connect the active surfaces 54 to the slip ring assembly 76. Discharge electrodes 55 and recharge electrodes 56 are similarly affixed to insulated lead wires 81, 82 such that lead wires 81 are connected at one end to the collector screens 66 and at the external end to one side of a battery load 83. Lead wires 82 from the recharge electrode 56 are connected to one side of a suitable recharge power supply 84. The output side of the slip ring assembly 76 is alternately connected by way of switch 85 to the battery load 83 during the discharge cycle, and to the recharge power supply 84 during the recharge cycle. A second switch 86 serves to disconnect the recharge electrode 56 from the recharge circuit during the normal discharge cycle.

Lastly, the other end of shaft 51 is operatively coupled to the output of a small gear reduced electric motor drive 79 which rotatably drives the disc electrode assembly as rapid as is practical. It is only necessary that the period of revolution of the rotary electrode be less than the time it takes for accumulation of a passivating layer of sufficient thickness to disrupt the electrochemical reaction. Moreover, the period of revolution or maximum angular velocity must be tailored to a specific battery size; that is electrode diameter. The velocity must be kept low particularly if the electrode diameter is large in order to prevent centrifugal separation of the electrolyte solids to the outer periphery of the reservoir. Generally, however, speeds will be within the range of about 0.5 to 30 r.p.m. and usually about 5 to 10 r.p.m. Power to drive 79 and air blower 64 is furnished from suitable connections (not shown) to the battery load 83. Because there is a small quantity of gas evolution during the recharge cycle, each module 50 is provided with an air vent 80 which facilitates release of gas generated during the recharge cycle and thereby maintains the internal pressure of the module at atmospheric level. The electrolyte can also be introduced into the module via vent 80.

The following Examples 1 to 3 illustrate typical electrical recharge capability of the present invention. In each example, a single cell embodiment substantially identical to that depicted in FIG. 1 was used. The active surface 2 of electrode 1 consisted of a 4-inch diameter disc fabricated from a sheet of 99.95 percent pure zinc. During each test run, the rotary disc electrode was driven between about 5 and 6 r.p.m. The cell temperature was recorded between 39 and 73.5° C.

EXAMPLE 1

This example shows that the thick slurry electrolytes must be agitated; otherwise, rapid settling of the solid zinc-oxide particles to the bottom of the reservoir occurs, thereby restricting their availability for plating on the zinc electrode during recharge.

A control test was conducted with a battery essentially as depicted in FIG. 1 except that the rotating zinc electrode was not equipped with agitator paddles. The electrolyte was a predetermined slurry consisting of 120 gms. ZnO per liter of an aqueous solution of 30 weight percent KOH plus about 0.2% of polyethylenimine having a molecular weight of 1200 to simulate a discharge condition.

After rotation of the zinc electrode for approximately two hours, a substantial quantity of ZnO particles had settled to the bottom of the reservoir. This accumulation of ZnO was observed through a poly(methylmethacrylate) window in the battery. It was also observed that the electrolyte had changed from a white opaque slurry to a clearly, transparent liquid through which details of the rotating zinc electrode could be observed. Such a change of electrolyte appearance is normally observed only when the unsaturated ZnO contained in the electrolyte is electrochemically plated on the zinc electrode.

In the example test, the battery configuration remained essentially unchanged except that the electrolyte contained a larger amount of ZnO (i.e., 315 gms. ZnO/liter) and 0.2% of polyethyleneimine having a molecular weight of 600. Agitation paddles were mounted on the zinc electrode. Again, the electrode was rotated at approximately 6 r.p.m. After 7½ hours of operation, it was observed the ZnO particles remained well dispersed in the electrolyte indicating that a preferred dispersion of ZnO throughout the electrolyte cannot be achieved by solely rotating the zinc electrode at relatively low speeds. Agitator blades on the other hand provide an adequate and practical means of achieving the required agitation at the low speeds.

EXAMPLE 2

This example illustrates the need for a wiper during recharge.

A control test was conducted with a battery essentially as described by FIG. 1 except that no wiper was used. The electrolyte was taken from a one-liter mixture consisting of 336 gms. KOH, 120 gms. ZnO, 0.3 gm. of polyethylenimine having a molecular weight of 1200 and water. The cell was charged at an average current density of 102 ma./cm.$^2$ while rotating the zinc electrode at an average speed of 5.8 r.p.m. for a period of six hours. The test was terminated due to an indication (i.e., fluctuation of the ammeter) of internal shorting. Upon disassembly of the battery, it was visually observed and estimated that about 20% of the zinc surface was covered with an accumulation of zinc oxide having a maximum thickness equal to the interelectrode gap.

In the example run under essentially the same conditions, a Neoprene® wiper as shown in FIG. 1 was added to sweep away the ZnO particles; no further accumulations were observed.

EXAMPLE 3

This example was conducted with the electrolyte and conditions of Example 1, but shows that the central section of the electrodes must be nonreactive to avoid the higher rate of zinc deposition in this area and the subsequent shorting of the cycle.

A control test was conducted using the battery configuration essentially as shown in FIG. 1 except that the entire circular disc of zinc was directly opposite a bar-shaped recharge electrode that was positioned along the diametrical centerline of the zinc electrode. After charging the cell for a period of about 2¼ hours, the cell was disassembled and inspected. It was clearly evident by a visual inspection of the zinc electrode that the deposit at the center of the zinc electrode was thicker than at any other area of the electrode. The thickness of the central deposit was sufficient to span the interelectrode gap and short the battery.

In the example, the central area of the zinc electrode was modified by an electrically insulated insert 28 as shown in FIG. 1. The electrically inactive central area of the electrode was observed after the test runs and found to have eliminated the previous high rate of deposition and its associated adverse effects.

EXAMPLE 4

This example shows that the suggested battery configuration can be operated in the charge and discharge modes with an electrolyte/zinc ratio as low as 4:1 while achieving practical output performance levels.

The battery configuration used in this test was essentially as shown in FIG. 1. Specific details of the battery construction and operation are summarized below:

BATTERY CONSTRUCTION

| | |
|---|---|
| Zinc Electrode Area | 68 cm.$^2$. |
| Recharge Electrode Area | 18 cm.$^2$. |
| Discharge Cathode Area | 18 cm.$^2$. |
| Interelectrode Gap Spacing | .040 in. at start. |
| Electrolyte | 6N KOH saturated with additive. |
| Electrolyte Volume (at beginning of discharge). | 124 ml. |
| Electrolyte Additive | Polyethylenimine (M.W. 600). |
| Electrolyte/Zinc Ratio at Full Discharge. | 4:1. |
| Wiper Material | 1/32" Teflon® sheet. |
| Wiper Angle ($\theta$) | 42°. |
| Cathode Construction | Porous Teflon® Film with Interspersed catalyst and used with expanded nickel screen current collector (Supplied by Leesona Moos Laboratories). |

TEST CONDITION

Discharge

| | | |
|---|---|---|
| Cell Temperature | °C | 25 |
| Zinc Electrode Speed | r.p.m. | 10 |
| Average Current Density (based on discharge cathode area) | ma./cm.$^2$ | 57 |
| Average Cell Voltage | V. | 1.02 |
| Ampere-hours discharged | | 30.8 |
| Period of Discharge | hours | 30 |

Charge

| | | |
|---|---|---|
| Cell Temperature | °C | 25 |
| Zinc Electrode Speed | r.p.m. | 10 |
| Current Density (based on recharge electrode area) | ma./cm.$^2$ | 56 |
| Ampere-hour Charge | | 34.3 |
| Period of Charge | hours | 45.4 |

What is claimed is:

1. A rechargeable zinc cell comprising: (1) a circular casing having a circular reservoir with electrolyte contained therein; (2) a rotatable electrode within said casing, having at least one planar zinc surface, enclosed coaxially in the reservoir; (3) a stationary planar air depolarizable electrode and a recharge electrode coplanar therewith, both within said casing spaced from the rotatable electrode; (4) means for preventing the electrochemical reaction in the axial area of the zinc surface; (5) wiper means so disposed between the said rotatable and stationary electrodes as to lightly abrade the zinc surface and to deflect particulate matter away from the axis, and (6) means for agitating the electrolyte to maintain particulate matter in suspension in said reservoir.

2. The rechargeable cell of Claim 1 wherein the means for preventing the electrochemical reaction in the axial area of the zinc surface is an electrically nonconductive zone on the zinc surface at the axial area.

3. The rechargeable cell of Claim 1 wherein the means agitating the electrolyte is at least one paddle affixed to the periphery of the rotatable electrode which extends radially into an annular space around the periphery of said electrode.

4. The rechargeable cell of Claim 1 wherein the stationary planar counterelectrode is divided into a recharge electrode and discharge electrode supported by the casing along at least a portion of one surface of the reservoir, said recharge electrode being a solid sector-shaped conductor adjacent and coplanar to the discharge electrode.

5. The rechargeable cell of Claim 4 wherein the discharge electrode is a sector-shaped, air-depolarizable electrode exposed to an oxygen-containing gas inlet and outlet.

6. The rechargeable cell of Claim 5 wherein the casing surface supporting the stationary planar electrode has therein a plurality of radially extending passageways exposed to the air-depolarizable electrode, said casing having at least one inlet to pass oxygen-containing gas to the passageways and at least one outlet to pass said gas from the cell.

7. The rechargeable cell of Claim 1 wherein the wiper means is at least one resilient blade mounted on said casing at an angle greater than 90° relative to the velocity vectors at the zinc surface to deflect particulate matter contained in the electrolyte radially outward.

8. The rechargeable cell of Claim 7 wherein the wiper means is a dual resilient blade mechanism comprising two elastomeric blades affixed to a rotatable shaft, one blade being more flexible than the other, said blades adapted to indpendently abrade the zinc surface and to be fully disengaged therefrom.

9. A rechargeable zinc-air cell comprising: (1) a circular casing having a circular liquid-tight reservoir with alkaline electrolyte contained therein, at least one surface of the casing along at least a portion of one surface of the reservoir having a plurality of radially extending passageways, said casing having at least one inlet to pass an oxygen-containing gas to the passageways and at least one outlet to pass the gas from the cell; (2) a rotatable electrode, having at least one planar zinc surface enclosed coaxially in the reservoir, and having a smaller diameter than said reservoir to form an annular reservoir around the periphery of said circular reservoir, said zinc surface having an electrically nonconductive zone covering the axial area; (3) at least one paddle affixed to the periphery of the rotatable electrode which extends radially into the annular reservoir; (4) a stationary planar counterelectrode spaced from the rotatable electrode so as to form a minimum constant width interelectrode gap of about 0.02 to 0.06 inch, said counterelectrode supported by the casing along at least one surface of the reservoir having said radially extending passageways, said counterelectrode divided into a solid, sector-shaped conductor recharge electrode and adjacent and coplanar thereto a sector-shaped air-depolarizable discharge electrode exposed to the radially extending passageways; and (5) a wiper means comprising at least one resilient blade for lightly abrading the zinc surface, said blade affixed to said casing and disposed between the electrodes at an angle greater than 90° relative to the velocity vectors at the zinc surface to deflect particulate matter contained in the electrolyte radially outward.

10. The rechargeable zinc-air cell of Claim 9 wherein the wiper means is a dual resilient blade mechanism comprising two elastomeric blades affixed to a rotatable shaft, one blade being more flexible than the other, said blades adapted to independently abrade the zinc surface and to be fully disengaged therefrom.

11. In the method of operating a rechargeable zinc cell having a planar positive electrode, a recharge electrode and a negative electrode in the form of a disc rotatable about an axis, said negative electrode being spaced from the positive electrode and recharge electrode, said positive and recharge electrodes are coplanar, with a consumable planar zinc surface subject to growth formation during charging, all of said electrodes immersed in an alkaline electrolyte, the improvement comprising: agitating the electrolyte, continuously smoothing and leveling the zinc surface during the charging of said cell with a resilient wiper blade and at least intermittently lightly abrading the zinc surface during discharging of said cell, with said wiper blade being displaced at an angle greater than 90° relative to the velocity vectors at the zinc surface to deflect particulate matter away from the axis.

12. The method of Claim 11 wherein the rotatable negative electrode is rotated at a rate between about 0.5 and 30 revolutions per minute.

References Cited

UNITED STATES PATENTS

| | | | |
|---|---|---|---|
| 3,716,413 | 2/1973 | Eisner | 136—86 A |
| 3,440,098 | 4/1969 | Stachurski | 136—141 X |
| 3,532,548 | 10/1970 | Stachurski | 136—86 A |
| 3,663,298 | 5/1972 | McCoy | 136—86 A X |

ALLEN B. CURTIS, Primary Examiner

H. A. FEELEY, Assistant Examiner

U.S. Cl. X.R.

136—164